(12) United States Patent
Pierce

(10) Patent No.: US 9,492,936 B2
(45) Date of Patent: Nov. 15, 2016

(54) LARGE DIAMETER TRAVELLING PIPE CUTTER

(71) Applicant: Illinois Tool Works Inc., Glenview, IL (US)

(72) Inventor: Kenneth R. Pierce, Arlington Heights, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 705 days.

(21) Appl. No.: 13/787,401

(22) Filed: Mar. 6, 2013

(65) Prior Publication Data

US 2014/0026731 A1 Jan. 30, 2014

Related U.S. Application Data

(60) Provisional application No. 61/676,973, filed on Jul. 29, 2012.

(51) Int. Cl.
*B23B 3/22* (2006.01)
*B23D 3/06* (2006.01)
(Continued)

(52) U.S. Cl.
CPC .......... *B26D 3/16* (2013.01); *B23D 21/04* (2013.01); *B23D 45/126* (2013.01); *B23Q 9/0057* (2013.01); *B26D 3/167* (2013.01);
(Continued)

(58) Field of Classification Search
CPC .... B23Q 9/0057; B26D 7/2614; B26D 3/16; B26D 21/06; B26D 21/08; B26D 21/10; B26D 45/126; Y10T 83/674; Y10T 83/68; Y10T 83/667; B23D 21/04

USPC ............ 82/70.2, 100, 47; 83/744; 30/95, 96
See application file for complete search history.

(56) References Cited

U.S. PATENT DOCUMENTS 1,183,158 A * 5/1916 Auble .................... B23D 21/04
266/56
1,796,691 A * 3/1931 Jansen .................. B05C 5/0241
118/107

(Continued)

FOREIGN PATENT DOCUMENTS

CH 618370 A5 * 7/1980 .......... B21D 19/046
DE 1715114 U 1/1956
(Continued)

OTHER PUBLICATIONS

International Search Report and Written Opinion for PCT/US2013/052384, dated Feb. 28, 2014, 18 pages.

*Primary Examiner* — Sara Addisu
(74) *Attorney, Agent, or Firm* — Klintworth & Rozenblat IP LLC

(57) ABSTRACT

Pipe machining apparatuses, such as traveling pipe cutters, are provided. One such pipe machining apparatus may cut or bevel a hollow vessel while traveling around the vessel, and include a frame including a top end and a bottom end with the bottom end adjacent an outer surface of the vessel. The apparatus also includes a cable wrapped around the vessel and a pair of rollers coupled to the frame with each roller defining a groove therein for receiving the cable. Each roller rotates about an axis that extends generally parallel to a central longitudinal axis of the vessel. The cable is positioned in each groove of the pair of rollers and each axis is positioned between the cable and the outer surface of the vessel. The cable is tensioned to provide a force on the frame in a direction toward the outer surface of the vessel.

17 Claims, 7 Drawing Sheets

(51) Int. Cl.
  *B26D 3/16* (2006.01)
  *B26D 7/26* (2006.01)
  *B23D 45/12* (2006.01)
  *B23D 21/04* (2006.01)
  *B23Q 9/00* (2006.01)
  B23D 21/06 (2006.01)
  B23D 21/08 (2006.01)

(52) U.S. Cl.
  CPC .......... *B26D 7/2614* (2013.01); *B23D 21/06* (2013.01); *B23D 21/08* (2013.01); *Y10T 83/674* (2015.04); *Y10T 83/68* (2015.04)

(56) References Cited

U.S. PATENT DOCUMENTS

| | | | | |
|---|---|---|---|---|
| 1,985,541 | A * | 12/1934 | Hoefer | B23D 21/04 30/97 |
| 2,291,395 | A | 7/1942 | Levey | |
| 2,716,280 | A * | 8/1955 | Ruhe | B23D 21/08 30/100 |
| 2,842,238 | A * | 7/1958 | Shaw et al. | 409/179 |
| 2,974,694 | A * | 3/1961 | Mattila et al. | 83/744 |
| 3,135,850 | A | 6/1964 | Scheiler et al. | |
| 3,157,945 | A * | 11/1964 | Picking | B23D 21/08 30/100 |
| 3,168,002 | A * | 2/1965 | Walling | B23B 5/16 30/97 |
| 3,555,239 | A * | 1/1971 | Kerth | 219/124.34 |
| 3,604,612 | A * | 9/1971 | Miller et al. | 228/45 |
| 3,688,615 | A * | 9/1972 | Protze et al. | 82/70.2 |
| 3,702,913 | A * | 11/1972 | Kazluaskas et al. | 219/60 A |
| 3,760,664 | A * | 9/1973 | Gossling | 82/63 |
| 3,807,047 | A * | 4/1974 | Sherer | B23D 21/02 30/101 |
| 3,840,170 | A * | 10/1974 | Arikawa | B23K 37/0217 219/125.11 |
| 3,942,248 | A * | 3/1976 | Sherer | B23D 21/04 30/103 |
| 3,943,626 | A * | 3/1976 | Williams | B26D 3/169 30/100 |
| 4,048,720 | A * | 9/1977 | Wheeler | B23Q 9/0014 144/73 |
| 4,084,463 | A * | 4/1978 | Kanbara | B23B 5/16 82/19 |
| 4,091,514 | A * | 5/1978 | Motes-Conners | B23C 3/007 228/29 |
| 4,185,525 | A * | 1/1980 | Sherer | 82/113 |
| 4,205,573 | A * | 6/1980 | D'Angelo | B26D 3/006 83/56 |
| 4,206,664 | A * | 6/1980 | Miyagawa | B23D 21/04 82/113 |
| 4,213,357 | A * | 7/1980 | Lively | B23D 21/04 82/113 |
| 4,318,391 | A | 3/1982 | Wachs et al. | |
| 4,322,262 | A * | 3/1982 | Cottam | B65H 81/08 156/392 |
| 4,359,820 | A * | 11/1982 | Wheeler et al. | 30/97 |
| 4,397,202 | A * | 8/1983 | Mayfield | B23B 5/162 82/128 |
| 4,418,591 | A * | 12/1983 | Astle | B23B 5/163 30/97 |
| 4,440,383 | A * | 4/1984 | Dearman | 266/54 |
| 4,490,909 | A | 1/1985 | Wachs et al. | |
| 4,543,861 | A | 10/1985 | Kwech et al. | |
| 4,655,108 | A | 4/1987 | Galos | |
| 4,663,844 | A * | 5/1987 | Vegge | B23D 21/00 29/746 |
| 4,677,884 | A | 7/1987 | Kwech et al. | |
| 4,682,919 | A * | 7/1987 | Mitchell | 409/179 |
| 4,739,685 | A | 4/1988 | Ricci | |
| 4,757,977 | A * | 7/1988 | Krieg | 266/56 |
| D297,144 | S * | 8/1988 | Kazlauskas | D15/144 |
| 4,762,038 | A | 8/1988 | Olson | |
| 4,763,413 | A * | 8/1988 | Rothenberger | B23D 21/08 30/100 |
| 4,767,048 | A * | 8/1988 | Kimbrough et al. | 228/29 |
| 4,791,842 | A | 12/1988 | Olson | |
| 4,909,114 | A * | 3/1990 | Astle | 83/745 |
| 4,939,964 | A | 7/1990 | Ricci | |
| 4,944,205 | A * | 7/1990 | Ricci | B23B 3/26 82/113 |
| 5,054,342 | A | 10/1991 | Swiatowy et al. | |
| 5,159,756 | A * | 11/1992 | McGuire | 30/92 |
| 5,361,659 | A * | 11/1994 | Hanson | 82/113 |
| 5,368,399 | A | 11/1994 | Tremblay | |
| 5,429,021 | A | 7/1995 | Astle et al. | |
| 5,520,734 | A * | 5/1996 | Taylor | B05B 13/0214 118/307 |
| 5,549,024 | A | 8/1996 | Ricci | |
| 5,596,914 | A * | 1/1997 | Liao | 82/70.2 |
| 5,992,277 | A * | 11/1999 | Dalseide | 82/130 |
| 6,141,876 | A * | 11/2000 | Hamm | B23D 21/06 30/100 |
| 6,938,313 | B2 * | 9/2005 | Viola et al. | 29/33 T |
| 6,966,731 | B2 | 11/2005 | VanderPol et al. | |
| 7,089,668 | B1 * | 8/2006 | Whitehead | B23B 5/168 30/94 |
| 7,270,505 | B2 | 9/2007 | VanderPol et al. | |
| 7,578,643 | B1 * | 8/2009 | Karow | 409/179 |
| 7,811,034 | B1 * | 10/2010 | Karow | 409/179 |
| 7,992,473 | B2 * | 8/2011 | Marple et al. | 82/113 |
| 8,181,555 | B2 * | 5/2012 | Clements et al. | 82/70.2 |
| 8,720,070 | B2 * | 5/2014 | Sterner | B23D 79/12 30/100 |
| 8,826,785 | B2 * | 9/2014 | Wang et al. | 82/70.2 |
| 8,997,611 | B1 * | 4/2015 | Walton et al. | 82/113 |
| 2004/0149103 | A1 * | 8/2004 | Rundell | B26D 7/02 83/452 |
| 2004/0234352 | A1 | 11/2004 | Vanderpol | |
| 2008/0216325 | A1 * | 9/2008 | Loporchio | B26D 3/169 30/97 |
| 2010/0162860 | A1 | 7/2010 | Hall et al. | |
| 2014/0026731 | A1 * | 1/2014 | Pierce | 83/744 |
| 2014/0096655 | A1 * | 4/2014 | Coakley | 82/72 |
| 2014/0190322 | A1 * | 7/2014 | Pierce et al. | 82/70.2 |
| 2014/0196582 | A1 * | 7/2014 | Pierce et al. | 82/47 |
| 2015/0096421 | A1 * | 4/2015 | Pierce et al. | 83/829 |

FOREIGN PATENT DOCUMENTS

| | | | |
|---|---|---|---|
| DE | 29721223 U1 | 4/1998 | |
| EP | 0826467 A1 | 3/1998 | |
| GB | 139326 A | 3/1920 | |
| IE | WO 2015063750 A1 * | 5/2015 | B23Q 9/0057 |
| JP | 58102601 A * | 6/1983 | |
| JP | 63084812 A * | 4/1988 | |
| NL | 8401651 A | 12/1985 | |

* cited by examiner

LARGE DIAMETER TRAVELLING PIPE CUTTER

RELATED APPLICATIONS

The present application claims the benefit of U.S. Provisional Patent Application No. 61/676,973, filed Jul. 29, 2012, the entire contents of which is incorporated herein by reference.

FIELD OF THE INVENTION

The present disclosure generally relates to pipe machining apparatuses and, more particularly, to pipe machining apparatuses for machining large diameter pipes.

BACKGROUND

Pipe machining apparatuses, such as travelling pipe cutters, which carry a slitting saw around a cylindrical hollow vessel or pipe, are known in the art. Travelling pipe cutters may be suitable for cutting through a wall of a cylindrical vessel having various thicknesses.

When cutting large diameter cylindrical vessels, such as those having a diameter greater than two meters, it may be difficult to cut through an outer wall of that vessel, especially if the thickness of that outer wall is greater than two centimeters. A traditional travelling pipe cutter that uses a chain to travel around a cylindrical vessel may not be able to create a sufficient amount of downward force to press a cutting tool into and through a wall of a large diameter cylindrical vessel.

SUMMARY

It would be desirable to have a travelling pipe cutter which is able to more readily cut through and bevel a wall of a large diameter cylindrical vessel than traditional travelling pipe cutters with lesser metal removal rate capability.

In one aspect, a pipe machining apparatus is provided and is adapted to perform at least one of cutting and beveling a hollow vessel while traveling around the hollow vessel. The pipe machining apparatus includes a frame including a top end and a bottom end. The bottom end is opposed to the top end and is adjacent an outer surface of the hollow vessel. The pipe machining apparatus also includes a cable wrapped around the hollow vessel and a pair of rollers coupled to the frame with each roller defining a groove therein for receiving the cable. Each roller rotates about an axis that extends generally parallel to a central longitudinal axis of the hollow vessel. The cable is positioned in each groove of the pair of rollers and each axis is positioned between the cable and the outer surface of the hollow vessel. The cable is tensioned to provide a force on the frame in a direction toward the outer surface of the hollow vessel.

In another aspect, a pipe machining apparatus is provided and is adapted to perform at least one of cutting and beveling a hollow vessel while traveling around the hollow vessel. The pipe machining apparatus includes a frame including a top end and a bottom end. The bottom end is opposed to the top end and is adjacent an outer surface of the hollow vessel. The pipe machining apparatus also includes a cable wrapped around the hollow vessel, a drive mechanism coupled to the frame and including a drive shaft, and a driven member coupled to the frame and defining a groove therein. The cable is positioned in the groove, wrapped around the driven member, and tensioned. The driven member is coupled to the drive mechanism via the drive shaft which is adapted to rotate the driven member in either a clockwise direction or a counterclockwise direction. The driven member is adapted to move the frame along the outer surface of the hollow vessel in a first direction corresponding to rotation of the driven member in the clockwise direction and in a second direction, opposite the first direction, corresponding to rotation of the driven member in the counterclockwise direction.

In a further aspect, a pipe machining apparatus is provided and is adapted to perform at least one of cutting and beveling a hollow vessel while traveling around the hollow vessel. The pipe machining apparatus includes a frame including a top end and a bottom end. The bottom end is opposed to the top end and is adjacent an outer surface of the hollow vessel. The pipe machining apparatus also includes a guide assembly positioned around the hollow vessel and including a track, and a pair of guide rollers coupled to and adapted to rotate relative to the frame. Each guide roller defines a groove adapted to receive the track therein, and the pair of guide rollers are positioned on the track to allow the frame to follow a path along the outer surface of the hollow vessel.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

Figure 1:
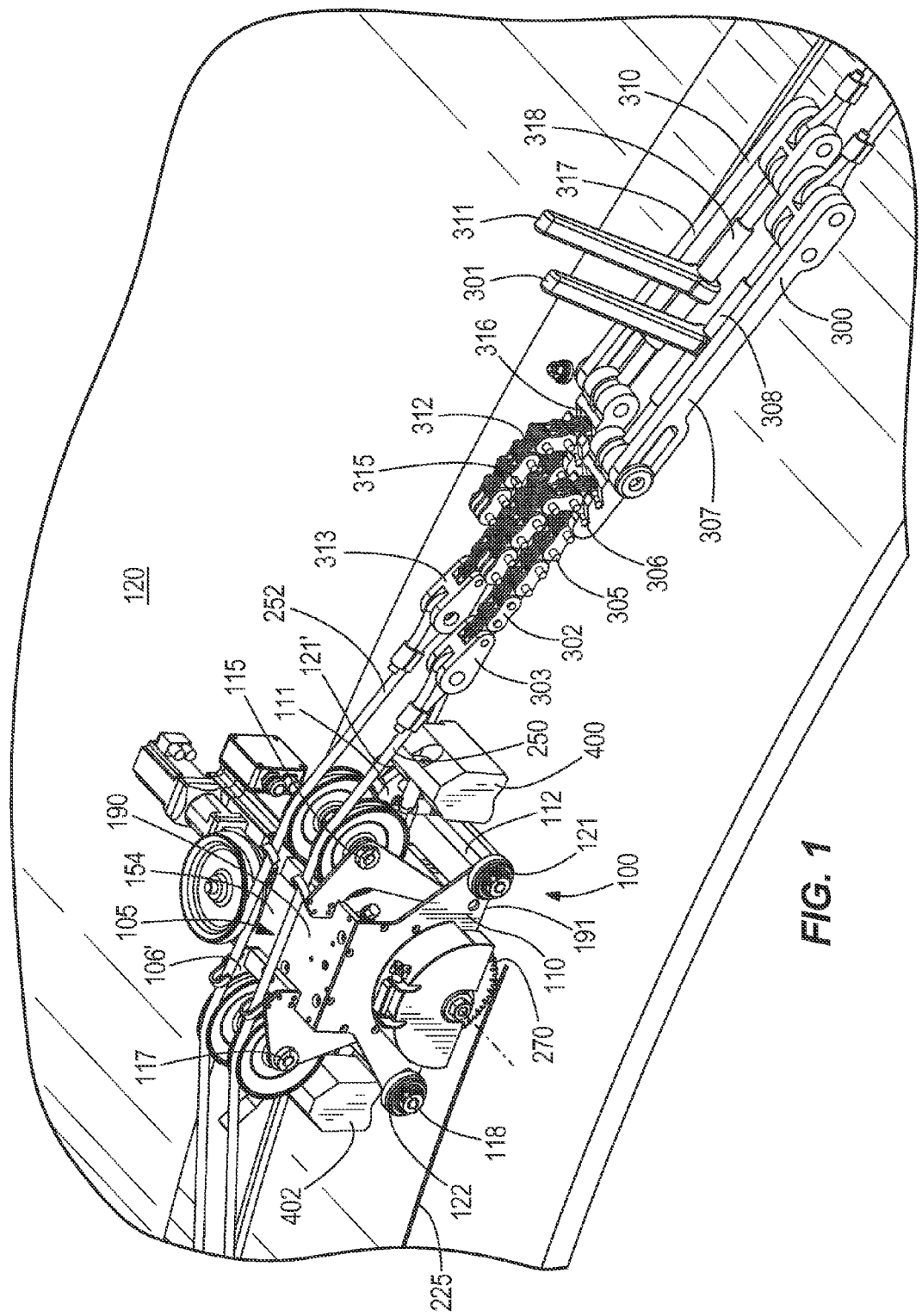
FIG. 1 depicts a perspective view of an exemplary travelling pipe cutter coupled to a generally cylindrical hollow vessel, in accordance with one embodiment of the present invention.
Figure 2:
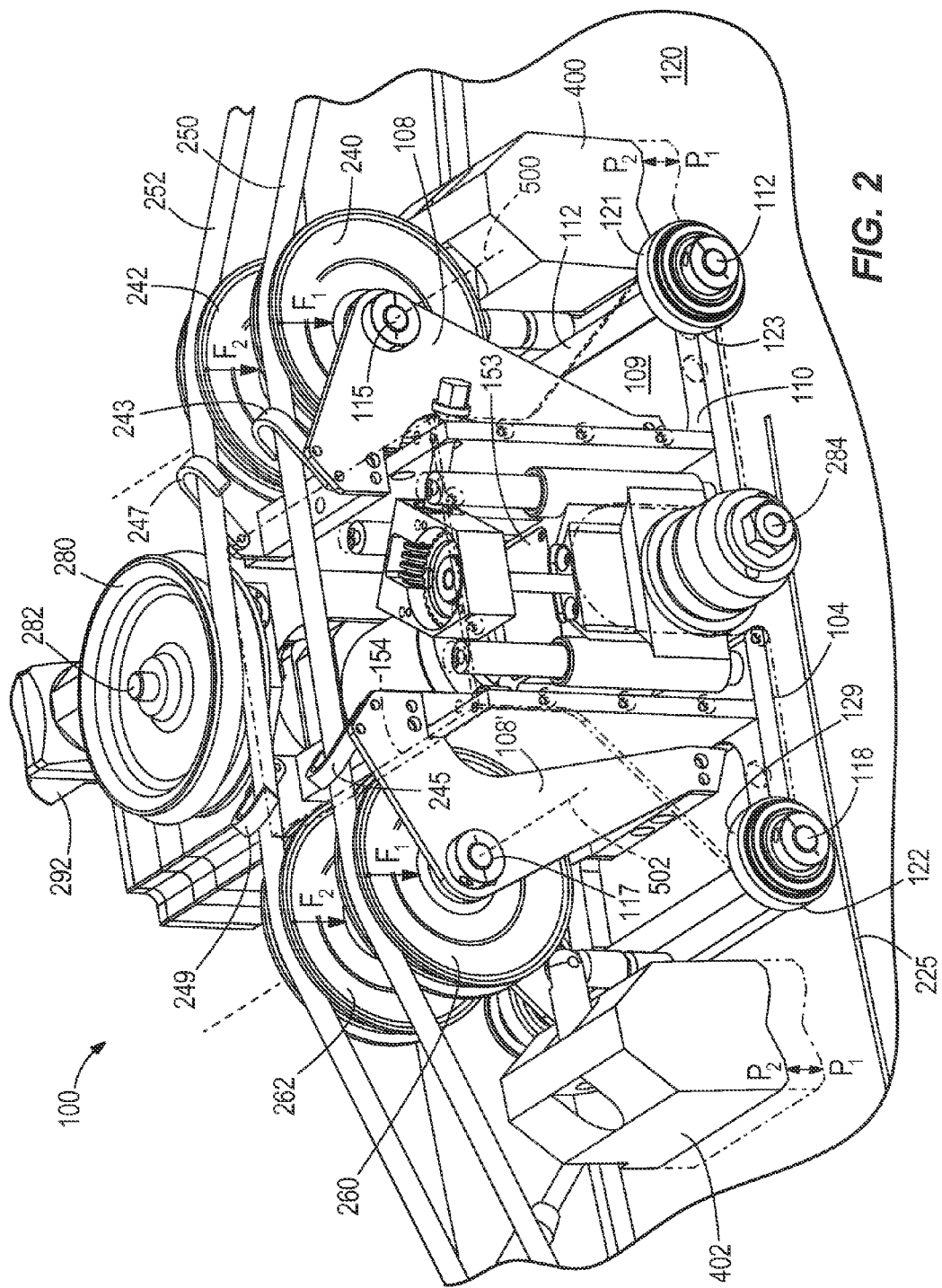
FIG. 2 depicts an enlarged perspective view of the travelling pipe cutter shown in FIG. 1 with a portion thereof shown in phantom to expose internal components of the traveling pipe cutter, in accordance with one embodiment.

With reference to FIG. 1, an exemplary pipe machining apparatus such as, for example, a travelling pipe cutter 100, is shown and includes a frame 105 with a pair of spaced-apart side plates 110 and 111. Pipe cutter 100 may be used to cut through and/or form a bevel on a hollow vessel 120. Frame 105 has a top end 190 opposed to a bottom end 191 adjacent an outer surface of a hollow vessel 120. These plates 110, 111 are rigidly interconnected by tubular members 112, 115, 117, 118 extending there between including tubular members 115 and 112 at a rear of the pipe cutter 100 and tubular members 117 and 118 at a front of the pipe cutter 100. These tubular members 112, 115, 117, 118 are connected at their ends to the side plates 110, 111 to make a rigid frame 105. Side plate 110 includes a first set of plates 108, 108' connected with a second plate 109, as shown in FIG. 2. Side plate 111 includes a first set of plates 106, 106' connected with a second plate 107. Tubular member 115 is connected at its ends to side plates 108, 106 and tubular member 117 is connected at its ends to side plates 108', 106' to make a rigid frame 105. Tubular members 118, 112 are connected at their ends to side plates 107, 109 to make a rigid frame 105.

Figure 3:
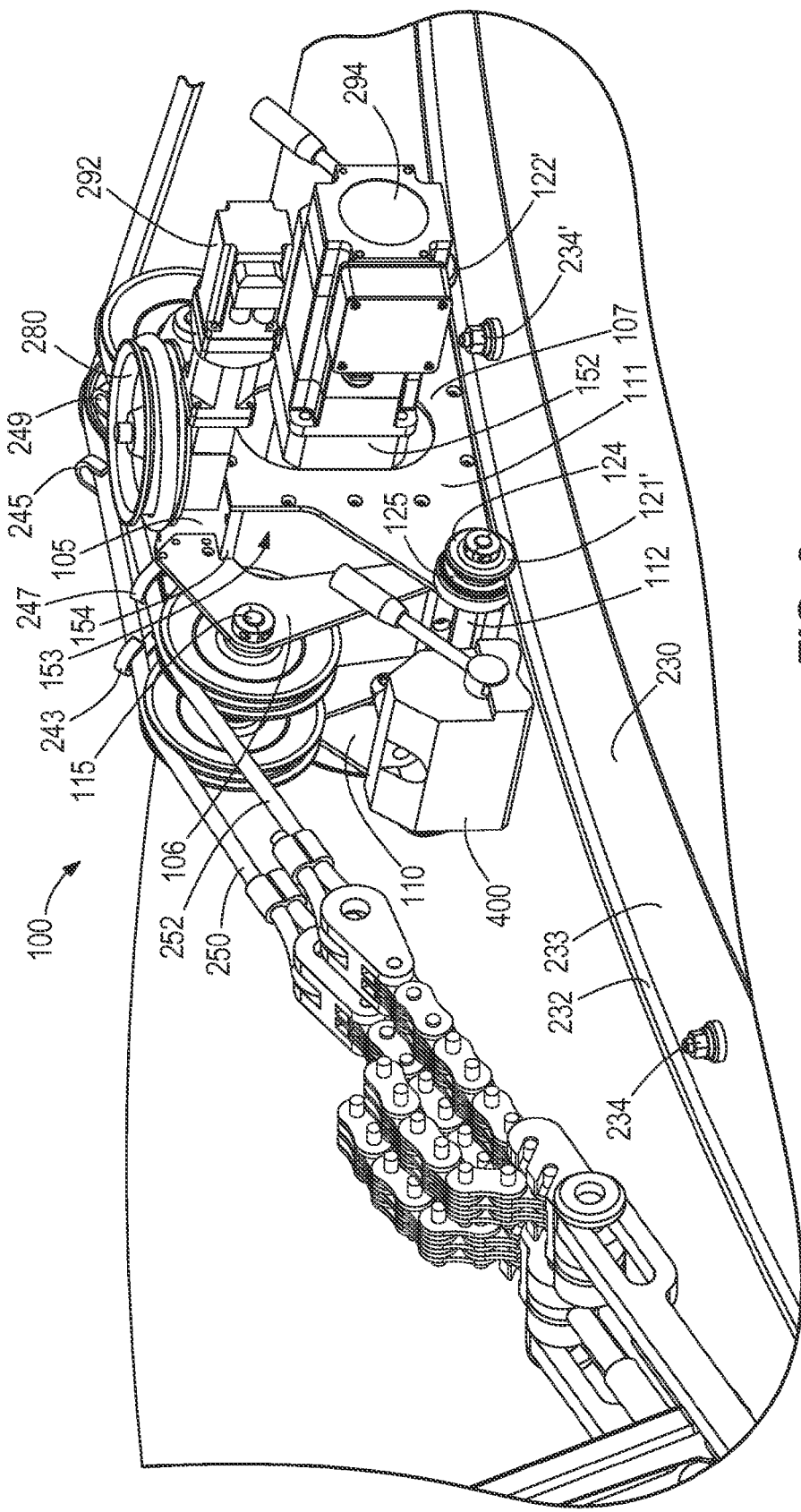
FIG. 3 depicts another perspective view of the travelling pipe cutter shown in FIG. 1, in accordance with one embodiment.

With reference to FIGS. 1 and 3, the pipe cutter 100 is supported on a generally cylindrical hollow vessel 120, such as a large diameter pipe, for movement about a circumference of the hollow vessel 120 by a plurality of pairs of guide rollers 121, 121' and 122, 122' extending outwardly from each of the side plates 110, 111. It should be understood that the pipe cutter 100 may be adapted to be coupled to hollow vessels of any shape and size such as, for exemplar, oval, square, rectangular, or any other polygonal or arcuately perimetered vessel Inner guide rollers 121 and 122 extend outwardly from the side plate 110 of the frame 105 and a corresponding outer pair of guide rollers 121' and 122' extend outwardly from the side plate 111. Each end of tubular member 112 is respectively fitted to one guide roller 121, 121' with each guide roller 121, 121' rotatable around tubular member 112. Each end of tubular member 118 is respectively fitted to one guide roller 122, 122' with each guide roller 122, 122' rotatable around tubular member 118. Outer guide rollers 121' and 122' are positioned on a guide track assembly 230, and specifically, on a track 232 formed by the guide track assembly 230. The guide track assembly 230 is an L-shaped member having a track or contoured projection 232 connected with an engagement member 233, which is fastened to the hollow vessel 120 preferably via a series of removably connected fasteners 234, 234'. The engagement member 233 has a form which generally follows an outer circumference of the hollow vessel 120. Positioning the outer guide rollers 121' and 122' on the guide track assembly 230 allows the pipe cutter 100 to make a more accurate cut of the hollow vessel 120.

With reference to FIG. 2, the inner guide rollers 121, 122 are shown and include surfaces 123 and 129 adapted to ride on an outer surface of the hollow vessel 120. With reference to FIG. 3, the outer guide rollers 121', 122' are shown and include spaced-apart flanges or lands 124 adapted to ride on either side of the track 232 and are on either side of a reduced diameter section or groove 125 which rides on, and allows the frame 105 to ride on, the track 232. The pipe cutter 100 follows an accurate path about the hollow vessel 120 as determined by the track 232.

It will be readily apparent that the track 232 can come in either a single unitarily formed piece or a plurality of sections that may be interconnected and fitted around the hollow vessel 120 to form a continuous track 232. Whether the track 232 is a single unitarily formed piece or a plurality of sections, the track 232 may be fastened to the hollow vessel 120 using fasteners 234, 234'.

With reference to FIGS. 1 and 2, at least one tension cable 250 is wrapped around the hollow vessel 120 and over the frame 105. The cable 250 may be guided over the frame 105 via a path. In one embodiment, a path is formed for guiding the tension cable 250 using a plurality of grooved rollers 240, 260 and a plurality of guides 243, 245. Grooved roller 240 forms a groove for receiving the tension cable 250 and is fitted to and rotates around tubular member 115. Grooved roller 260 forms a groove for receiving the tension cable 250 and is fitted to and rotates around tubular member 117. Tension cable 250 is inserted or threaded through the pair of guides 243, 245 connected with side plate 110 and adjacent rollers 240, 260, and the cable 250 is tensioned against at least one and preferably both grooved rollers 240, 260 in order to apply a downward force $F_1$ against the pipe cutter 100 in order to press and hold the pipe cutter 100 against the hollow vessel 120. In some exemplary embodiments, the downward force $F_1$ is greater than about 100 N. In other exemplary embodiments, the downward force $F_1$ is greater than about 1000 N. In further exemplary embodiments, the downward force $F_1$ is greater than about 10,000 N. This force $F_1$ presses the pipe cutter 100 against the hollow vessel 120 and helps a cutting tool 270 of the pipe cutter 100 pierce through an outer surface and wall of the hollow vessel 120.

Figure 7A:
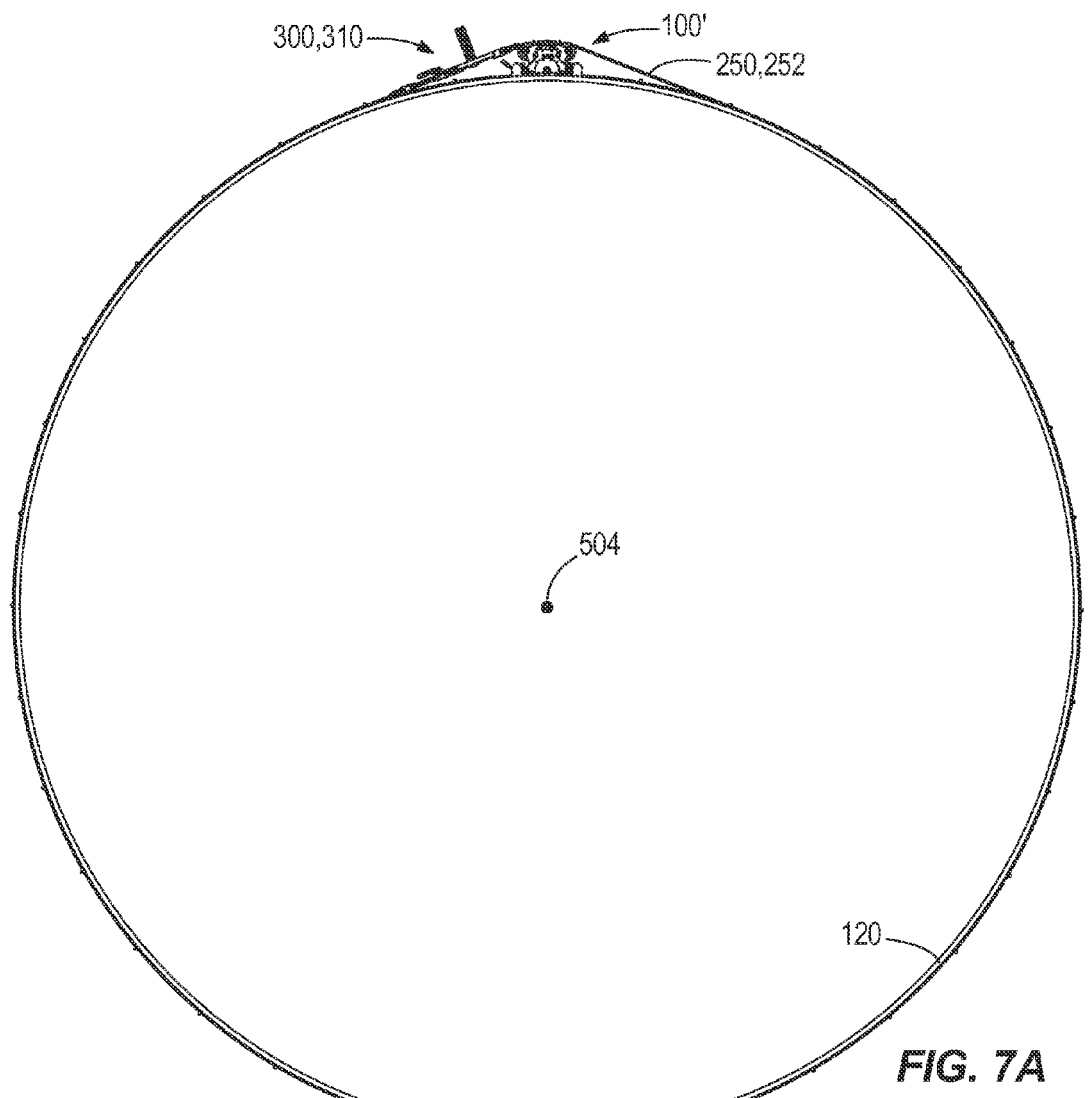
FIG. 7A depicts a side view of a pair of travelling pipe cutters coupled to a generally cylindrical hollow vessel, in accordance with one embodiment.

In the illustrated exemplary embodiment, a second grooved roller 242 forming a groove for receiving a feed cable 252 is fitted to and rotates around tubular member 115. The second feed cable 252 may be used to provide additional force $F_2$ down onto the frame 105, and/or the second feed cable 252 may be used to drive the pipe cutter around the hollow vessel 120. Grooved roller 262 forming a groove for receiving the feed cable 252 is fitted to and rotates around tubular member 117. Feed cable 252 is inserted or threaded through a pair of guides 247, 249 connected with side plate 111 and adjacent rollers 242, 262. The cable 252 is tensioned against at least one and preferably both grooved rollers 242, 262 in order to apply a further downward force $F_2$ against the pipe cutter 100 in order to press and hold the pipe cutter 100 against the hollow vessel 120. In some exemplary embodiments, the downward force $F_2$ is greater than about 100 N. In other exemplary embodiments, the downward force $F_2$ is greater than about 1000 N. In further exemplary embodiments, the downward force $F_2$ is greater than about 10,000 N. This downward force $F_2$ presses the pipe cutter 100 against the hollow vessel 120 and helps the cutting tool 270 of the pipe cutter 100 pierce through an outer surface and wall of the hollow vessel 120. Grooved rollers 240, 242 rotate about a first axis 500 and grooved rollers 260, 262 rotate about a second axis 502 with both the first and second axes 500, 502 aligned in a direction generally parallel with the outer surface and a central longitudinal axis 504 of the hollow vessel 120, as shown in FIGS. 2 and 7A.

With reference to FIG. 2, in one embodiment, the feed cable 252 is wrapped around a drive pulley, a driven member or a capstan 280, which is mounted to and rotates about a shaft 282. The capstan 280 is connected with drive mechanism 292 via shaft 282, which may rotate the capstan 280 in either a clockwise direction or a counterclockwise direction as desired. With the feed cable 252 wrapped around the capstan 280 under tension, the capstan 280 may be used to drive the pipe cutter 100 along the track 232 and around the hollow vessel 120 by simply rotating the capstan 280 using the drive mechanism 292. Drive mechanism 292 may be any device adapted to rotate shaft 282 and capstan 280 such as, for example, an electric motor, a fluid motor, an electric servo motor, a hydraulic motor, an air drive motor, etc. The motor 292 may be used in combination with a gear or series of gears.

In some exemplary embodiments, the tension cable 250 and the feed cable 252 may each wrap around the same capstan or respective different capstans and either or both cables 250, 252 may be used to drive the pipe cutter 100 along the track 232 and around the hollow vessel 120. Additionally, either or both cables 250 and 252 may be tensioned to provide a downward force $F_1$ or $F_2$ onto the frame 105. Furthermore, while only one tension cable 250 and one feed cable 252 are shown, multiple tension cables 250 and multiple feed cables 252 may be used to provide additional downward force or drive capabilities for the pipe cutter 100.

Referring again to FIG. 1, each cable 250 and 252 extends around the hollow vessel 120 and connects at both ends to a respective tension interface cable assembly 300 and 310. Each tension interface cable assembly 300, 310 includes a tension cable interface 303, 313 at one end connected with a respective cable 250, 252 and a respective chain 302, 312 with sprockets at an opposing end. At least some of the sprockets include projections 305, 315 which are inserted into one of a series of shafts 306, 316 formed on a lever tension interface 307, 317. Alternatively, other types of structures may be used, such as a link chain having links which are captured by members formed on the lever tension interface 307, 317. The chains 302, 312 and sprockets form an adjustable link coupling in that any one of a number of sprockets on the chain 302, 312 may be inserted into any one of a number of projections 305, 315 in order to adjust the eventual length of each cable 250, 252 so that the length of cable 250 is approximately equal to the length of cable 252. Equalizing the lengths of each cable 250, 252 helps reduce any imbalance between the cables 250, 252 before tensioning each cable 250, 252.

The tension on each cable 250, 252 can be adjusted through each lever tension interface 307, 317. Each lever tension interface 307, 317 includes a tensioning lever 301, 311 which, when moved in a ratcheting motion, increases or reduces the overall length of a corresponding member 308, 318 and, in effect, reduces or increases the amount of tension on each cable 250, 252. An overall length of each lever tension interface 307, 317 is adjustable using the tensioning lever 301, 311. As the tension on each cable 250, 252 increases, the amount of downward force $F_1$ and/or $F_2$ applied to the pipe cutter 100 increases.

In the travel of the pipe cutter 100 about the hollow vessel 120, a cut 225 is made through a wall of the hollow vessel 120 by the cutting tool 270. In some exemplary embodiments, the cutting tool 270 may be a metal-cutting slitting saw or a bevel type form cutter 270. The drive for the feeding of the pipe cutter 100 about the hollow vessel 120 and the rotation of the cutter 270 is derived from a pair of motors 292 and 294 mounted to a change gear box 152 connected to a main gear box 153. Motors 292 and 294 may be any type of motor such as, for example, fluid motors, electric servo motors, hydraulic motors, air drive motors, etc. The main gear box 153 has a bottom and four side walls. A removable cover 154 seals the main gear box 153. In some exemplary embodiments, the motors 292, 294 may be hydraulic motors with each hydraulic motor connected into a hydraulic circuit and suitable valving utilized to control the flow of oil to each motor 292, 294. The rate of delivery of oil controls the speed of each motor 292, 294 and gearing within the gear boxes 152, 153 together determines the speed of each respective drive shaft 282 and 284 and associated capstan 280 or the cutter 270.

Figure 4:
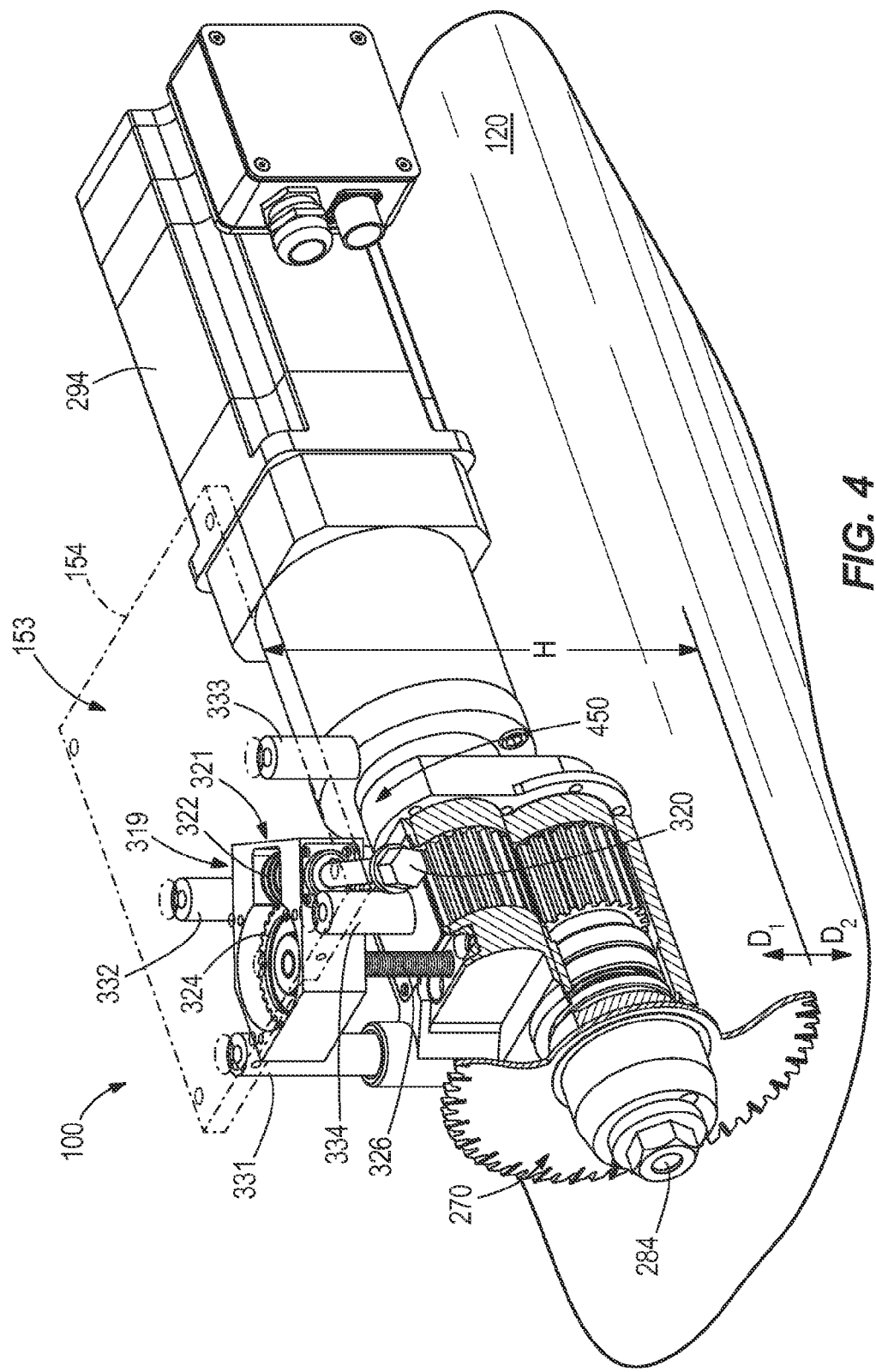
FIG. 4 depicts an enlarged cutaway perspective view of a portion of the travelling pipe cutter shown in FIG. 1, in accordance with one embodiment.

With reference to FIG. 4, the pipe cutter 100 includes a center mount plunge feed system 319 with a self-locking worm drive 321 to lower or raise the cutting tool 270 and shaft 284 in a direction $D_1$ away from or a direction $D_2$ towards the outer surface of the hollow vessel 120. An adjustment mechanism 320, such as a bolt or other threaded fastener, extends out from or projects from a side of the frame 105 or gear box 153 of the pipe cutter 100, underneath the removable cover or top plate 154 of the gear box 153 or top end 190 of the frame 105.

The adjustment mechanism 320 can be rotated using a tool such as, for example, a power tool, drill or a hand ratchet wrench, either clockwise or counterclockwise. The adjustment mechanism 320 is connected with a self-locking worm drive 321 and, specifically, with a worm shaft 322 of the self-locking worm drive 321. The worm shaft 322 is connected with a worm gear 324 forming the self-locking worm drive 321. The worm gear 324 is connected with a threated shaft 326. The threaded shaft 326 is threaded through a threaded opening of the worm gear 324 so that when the worm gear 324 rotates, the threaded shaft 326 moves in either a direction $D_1$ away from or a direction $D_2$ towards the outer surface of the hollow vessel 120 depending on the direction of rotation of the worm gear 324. Conversely, the worm gear 324 cannot rotate the worm shaft 322, thereby locking the threaded shaft 326 in place. The threaded shaft 326 is connected with the drive shaft 284 and movement of the threaded shaft 326 in a direction $D_1$ away from or a direction $D_2$ towards the outer surface of the hollow vessel 120, when the adjustment mechanism 320 is rotated, causes the drive shaft 284 to likewise move in the direction $D_1$ or $D_2$.

Reduced torque-imposed movement of pipe cutter 100 is provided by nesting reactionary feed components within the self-locking worm drive 321 on-center with and above slide and frame assemblies of the pipe cutter 100, such as the drive shaft 284. The worm shaft 322 permits a side feed adjustment of the cutting tool 270 either towards or away from the hollow vessel 120 using adjustment mechanism 320, which allows for adjustment during tight radial clearance applications and eliminates need for an added feed lock device, since the worm shaft 322 is self-locking.

Figure 5:
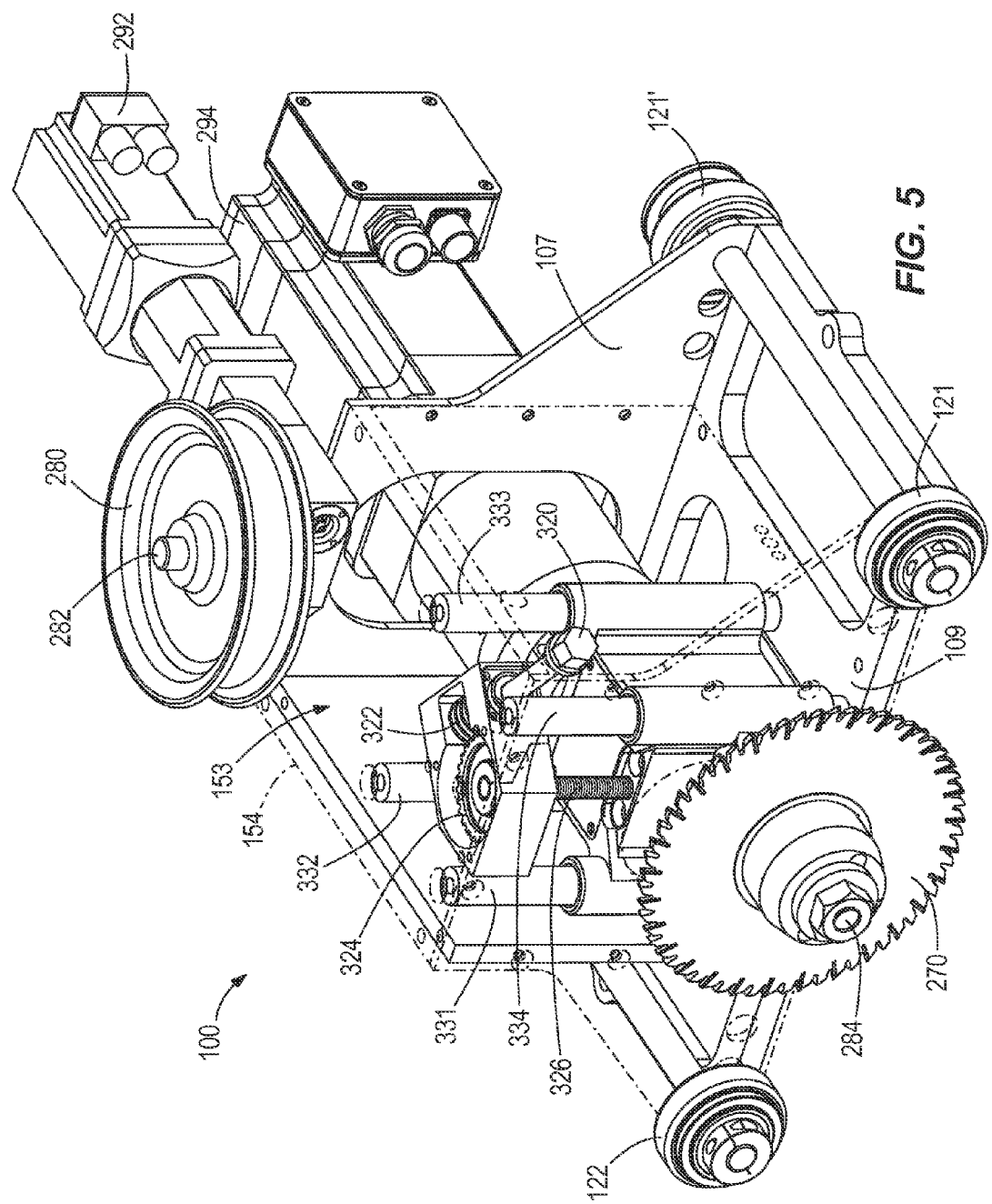
FIG. 5 depicts an enlarged perspective view of a portion of the travelling pipe cutter shown in FIG. 1 with a portion of the cutter shown in phantom to expose internal components, in accordance with one embodiment.

Additionally, an offset worm gear 324 with oversize length gears allows for a smaller gear clearance, and a smaller overall cutter height H (see FIG. 4) than conventional designs, while providing an optimum torque output. Moreover, the center mount plunge feed system 319 is nestled between a four-bar 331, 332, 333, 334 slide assembly 450 which connects to and suspends the drive shaft 284 and cutting tool 270 from the top plate 154 of the main gear box 153. This arrangement centers and divides reaction loads from drive shaft 284 and cutting tool 270 back to the frame 105, and provides an optimum guide rail diameter to length ratio with eight bearing points placed on the slide assembly 450 in a symmetric square pattern. That is, the four-bar 331, 332, 333, 334 slide assembly 450 structure gets further rigidity due to being coupled with eight slide bushings positioned in each corner of a symmetric cube pattern formed by the slide assembly 450, as shown in FIGS. 4 and 5.

With reference to FIGS. 1 and 2, In one exemplary embodiment, the travelling pipe cutter 100 includes at least one, and in some instances a pair of, magnets 400, 402 connected with the frame 105 and moveable from a first position $P_1$ adjacent a bottom end of the frame 105 to a second position P₂ away from a bottom end 104 of the frame 105. The magnets 400, 402 are used to engage the outer surface of the hollow vessel 120 when in the first position P₁ and are disengaged from the outer surface when in the second position P₂. By using magnets 400, 402 to engage the outer surface of the hollow vessel 120, the magnets 400, 402 can hold the frame 105 and the pipe cutter 100 in position so that cables 250, 252 can be positioned around the pipe cutter 100 within grooves of rollers 240, 242, 260, and 262 and used to secure the pipe cutter 100 to the hollow vessel 120. Once the pipe cutter 100 is secured to the hollow vessel 120 with cables 250, 252, the magnets 400, 402 may be disengaged from the hollow vessel 120 and moved to the second position P₂.

Referring now to FIGS. 6A-6E, exemplary set-up and assembly of the track assembly 230 and pipe cutter 100 will be described. The track assembly 230 and pipe cutter 100 may be set-up and assembled in a variety of different manners and all of such manners are intended to be within the spirit and scope of the present disclosure.

Figure 6A:
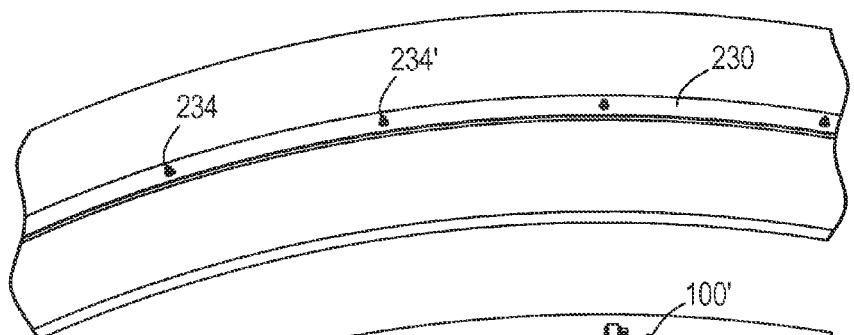
FIGS. 6A-6E depict an exemplary set-up or assembly sequence for coupling one or more travelling pipe cutters to a generally cylindrical hollow vessel, in accordance with one embodiment.

With reference to FIG. 6A, the guide track assembly 230 includes a plurality of sections of track 232 positioned around the hollow vessel 120 and then interconnected to form a continuous track 232 around the hollow vessel 120. The guide track assembly 230 is then fastened to the hollow vessel 120 using fasteners 234, 234'.

Figure 6B:
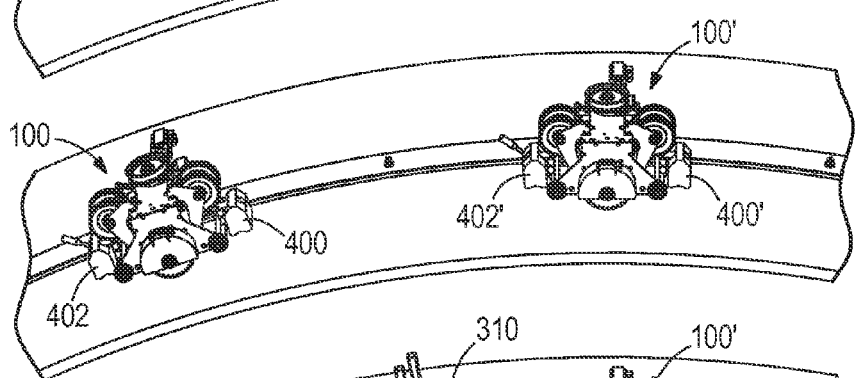

With reference to FIG. 6B, upon fastening the guide track assembly 230 to the hollow vessel 120, the pipe cutter 100 and, in the illustrated exemplary embodiment, a second pipe cutter 100' are positioned and secured to the hollow vessel 120 at a location near the top of the hollow vessel 120 using magnets 400, 402 and 400', 402', respectively.

Figure 6C:
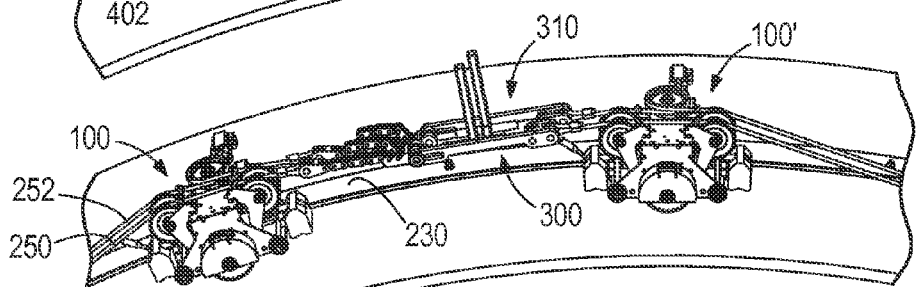

With reference to FIG. 6C, upon positioning and securing the pipe cutters 100, 100' atop the hollow vessel 120 with magnets 400, 402 and 400', 402', both feed and tension cables 250, 252 are wrapped around the hollow vessel 120 and over the frame 105, and each cable 250, 252 is guided over and fitted onto the frame 105 via a path. Then, a primary amount of tension is applied to each cable 250, 252 via the tension interface cable assemblies 300, 310. A second set of tension interface cable assemblies 300', 310' may be used in order to provide additional tensioning capabilities to each cable 250, 252 when multiple pipe cutters 100, 100' are mounted to a large diameter hollow vessel 120.

Figure 6D:
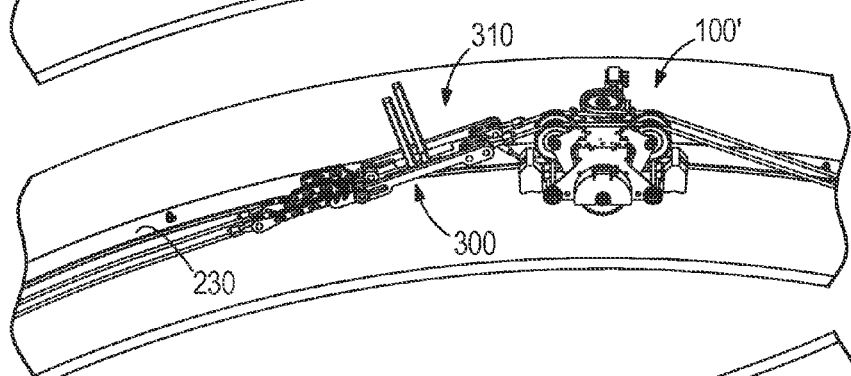

With reference to FIG. 6D, upon wrapping both feed and tension cables 250, 252 around the hollow vessel 120 and over the frame 105 and applying a primary amount of tension onto each cable 250, 252, magnets 400, 402 may be released from pipe cutter 100 and moved from a first position P₁ to a second position P₂. A final amount of tension may be applied to each cable 250, 252 and pipe cutter 100 can begin to cut through the outer surface and wall of the hollow vessel 120.

Figure 6E:
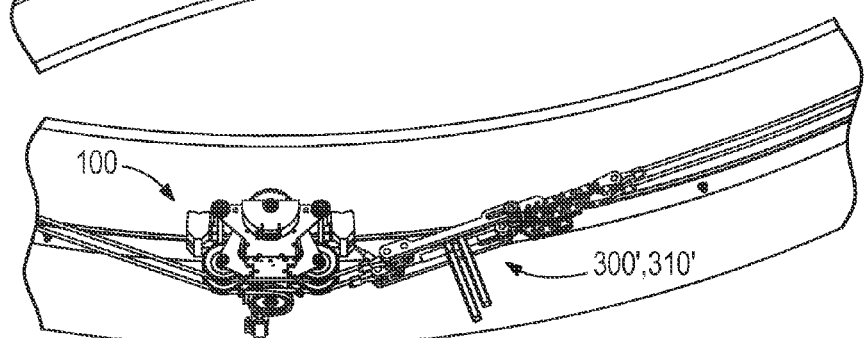
Figure 7B:
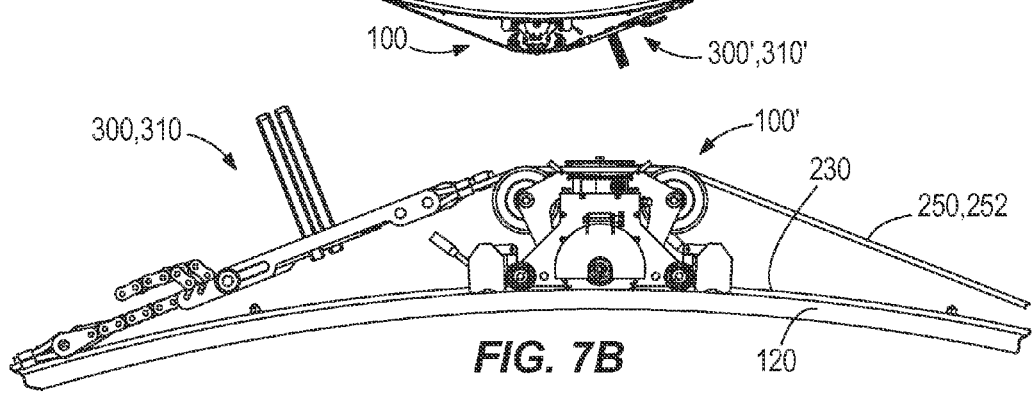
FIG. 7B depicts an enlarged side view of one of the travelling pipe cutters shown in FIG. 7A, in accordance with one embodiment.

When multiple pipe cutters 100, 100' are used, magnets 400, 402 from pipe cutter 100 are first released and moved from a first position P₁ to a second position P₂. Then, the pipe cutter 100 is moved into position, which in some exemplary embodiments is opposite from pipe cutter 100', as shown in FIG. 6E and FIG. 7A. With reference to FIGS. 7B and 6E, magnets 400', 402' from pipe cutter 100' are then released and both pipe cutters 100, 100' may simultaneously cut through the outer surface and wall of the hollow vessel 120.

In some exemplary embodiments, before any pipe cutter(s) 100 or 100' begins to cut, umbilical connections are completed and coolant systems and/or electrical systems are installed and connected to the pipe cutter(s) 100 or 100'.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A pipe machining apparatus adapted to perform at least one of cutting and beveling a hollow vessel while traveling around the hollow vessel, the pipe machining apparatus comprising:
   a frame including a top end and a bottom end, wherein the bottom end is opposed to the top end and is adjacent an outer surface of the hollow vessel;
   a cable wrapped around the hollow vessel;
   a pair of rollers coupled to the frame with each roller defining a groove therein for receiving the cable, wherein each roller rotates about an axis that extends generally parallel to a central longitudinal axis of the hollow vessel, wherein the cable is positioned in each groove of the pair of rollers and each axis is positioned between the cable and the outer surface of the hollow vessel, and wherein the cable is tensioned to provide a force on the frame in a direction toward the outer surface of the hollow vessel; and
   a pair of guides coupled to the frame, wherein the cable is inserted through the pair of guides.

2. The pipe machining apparatus of claim 1, wherein the hollow vessel is a generally cylindrical hollow vessel.

3. The pipe machining apparatus of claim 1, further comprising a magnet coupled to the frame and moveable from a first position, in which the magnet is adjacent the bottom end of the frame and engages the outer surface of the hollow vessel, to a second position, in which the magnet is away from the bottom end of the frame and is disengaged from the outer surface of the hollow vessel.

4. A pipe machining apparatus adapted to perform at least one of cutting and beveling a hollow vessel while traveling around the hollow vessel, the pipe machining apparatus comprising:
   a frame including a top end and a bottom end, wherein the bottom end is opposed to the top end and is adjacent an outer surface of the hollow vessel;
   a cable wrapped around the hollow vessel; and
   a pair of rollers coupled to the frame with each roller defining a groove therein for receiving the cable, wherein each roller rotates about an axis that extends generally parallel to a central longitudinal axis of the hollow vessel, wherein the cable is positioned in each groove of the pair of rollers and each axis is positioned between the cable and the outer surface of the hollow vessel, and wherein the cable is tensioned to provide a force on the frame in a direction toward the outer surface of the hollow vessel;

wherein the cable is positioned over the frame such that the frame is between the cable and the outer surface of the hollow vessel.

5. A pipe machining apparatus adapted to perform at least one of cutting and beveling a hollow vessel while traveling around the hollow vessel, the pipe machining apparatus comprising:

a frame including a top end and a bottom end, wherein the bottom end is opposed to the top end and is adjacent an outer surface of the hollow vessel;

a cable wrapped around the hollow vessel;

a pair of rollers coupled to the frame with each roller defining a groove therein for receiving the cable, wherein each roller rotates about an axis that extends generally parallel to a central longitudinal axis of the hollow vessel, wherein the cable is positioned in each groove of the pair of rollers and each axis is positioned between the cable and the outer surface of the hollow vessel, and wherein the cable is tensioned to provide a force on the frame in a direction toward the outer surface of the hollow vessel; and a tension interface cable assembly connected with each end of the cable, wherein the tension interface cable assembly includes a chain connected with the cable at one end and sprockets adjustably connected with a series of shafts formed on a lever tension interface at an opposing end, and wherein an overall length of the lever tension interface is adjustable using a tensioning lever.

6. A pipe machining apparatus adapted to perform at least one of cutting and beveling a hollow vessel while traveling around the hollow vessel, the pipe machining apparatus comprising:

a frame including a top end and a bottom end, wherein the bottom end is opposed to the top end and is adjacent an outer surface of the hollow vessel;

a cable wrapped around the hollow vessel;

a pair of rollers coupled to the frame with each roller defining a groove therein for receiving the cable, wherein each roller rotates about an axis that extends generally parallel to a central longitudinal axis of the hollow vessel, wherein the cable is positioned in each groove of the pair of rollers and each axis is positioned between the cable and the outer surface of the hollow vessel, and wherein the cable is tensioned to provide a force on the frame in a direction toward the outer surface of the hollow vessel;

a drive mechanism including a drive shaft;

a cutting tool coupled to the drive shaft for rotating the cutting tool; and a center mount plunge feed system including a self-locking worm drive adapted to move the cutting tool and the drive shaft in a first direction away from the outer surface of the hollow vessel and a second direction towards the outer surface of the hollow vessel;

wherein the center mount plunge feed system is located under a top plate of the frame, and wherein the center mount plunge feed system includes an adjustment mechanism coupled to the self-locking worm drive and projecting from a side of the frame.

7. A pipe machining apparatus adapted to perform at least one of cutting and beveling a hollow vessel while traveling around the hollow vessel, the pipe machining apparatus comprising:

a frame including a top end and a bottom end, wherein the bottom end is opposed to the top end and is adjacent an outer surface of the hollow vessel;

a cable wrapped around the hollow vessel;

a drive mechanism coupled to the frame and including a drive shaft; and a driven member coupled to the frame and defining a groove therein, wherein the cable is positioned in the groove, wrapped around the driven member, and tensioned, wherein the driven member is coupled to the drive mechanism via the drive shaft which is adapted to rotate the driven member in either a clockwise direction or a counterclockwise direction, and wherein the driven member is adapted to move the frame along the outer surface of the hollow vessel in a first direction corresponding to rotation of the driven member in the clockwise direction and in a second direction, opposite the first direction, corresponding to rotation of the driven member in the counterclockwise direction.

8. The pipe machining apparatus of claim 7, wherein the driven member rotates about an axis generally perpendicular to a central longitudinal axis of the hollow vessel.

9. The pipe machining apparatus of claim 7, wherein the hollow vessel is a generally cylindrical hollow vessel.

10. The pipe machining apparatus of claim 7, wherein the cable is positioned over the frame such that the frame is between the cable and the outer surface of the hollow vessel.

11. The pipe machining apparatus of claim 7, wherein the drive mechanism is a first drive mechanism and the drive shaft is a first drive shaft, the pipe machining apparatus further comprising:

a second drive mechanism including a second drive shaft;

a cutting tool coupled to the second drive shaft for rotating the cutting tool; and a center mount plunge feed system including a self-locking worm drive adapted to move the cutting tool and the second drive shaft in a first direction away from the outer surface of the hollow vessel and a second direction towards the outer surface of the hollow vessel.

12. A pipe machining apparatus adapted to perform at least one of cutting and beveling a hollow vessel while traveling around the hollow vessel, the pipe machining apparatus comprising:

a frame including a top end and a bottom end, wherein the bottom end is opposed to the top end and is adjacent an outer surface of the hollow vessel;

a guide assembly positioned around the hollow vessel and including a track; and a pair of guide rollers coupled to and adapted to rotate relative to the frame, wherein each guide roller defines a groove adapted to receive the track therein, and wherein the pair of guide rollers are positioned on the track to allow the frame to follow a path along the outer surface of the hollow vessel;

wherein each of the pair of guide rollers rotates about an axis that is generally parallel to a central longitudinal axis of the hollow vessel.

13. The pipe machining apparatus of claim 12, wherein the path is an arcuate path.

14. The pipe machining apparatus of claim 12, wherein the track is comprised of a plurality of sections interconnected together along the outer surface of the hollow vessel.

15. The pipe machining apparatus of claim 14, wherein the plurality of sections of the track are coupled to the hollow vessel with a plurality of fasteners.

16. The pipe machining apparatus of claim 12, wherein the hollow vessel is a generally cylindrical hollow vessel.

17. A pipe machining apparatus adapted to perform at least one of cutting and beveling a hollow vessel while traveling around the hollow vessel, the pipe machining apparatus comprising:
- a frame including a top end and a bottom end, wherein the bottom end is opposed to the top end and is adjacent an outer surface of the hollow vessel;
- a guide assembly positioned around the hollow vessel and including a track;
- a pair of guide rollers coupled to and adapted to rotate relative to the frame, wherein each guide roller defines a groove adapted to receive the track therein, and wherein the pair of guide rollers are positioned on the track to allow the frame to follow a path along the outer surface of the hollow vessel;
- a cable wrapped around the hollow vessel;
- a drive mechanism coupled to the frame and including a drive shaft; and
- a driven member coupled to the frame and defining a groove therein, wherein the cable is positioned in the groove, wrapped around the driven member, and tensioned, wherein the driven member is coupled to the drive mechanism via the drive shaft which is adapted to rotate the driven member in either a clockwise direction or a counterclockwise direction, and wherein the driven member is adapted to move the frame along the track in a first direction corresponding to rotation of the driven member in the clockwise direction and in a second direction, opposite the first direction, corresponding to rotation of the driven member in the counterclockwise direction.

* * * * *